Patented June 20, 1939

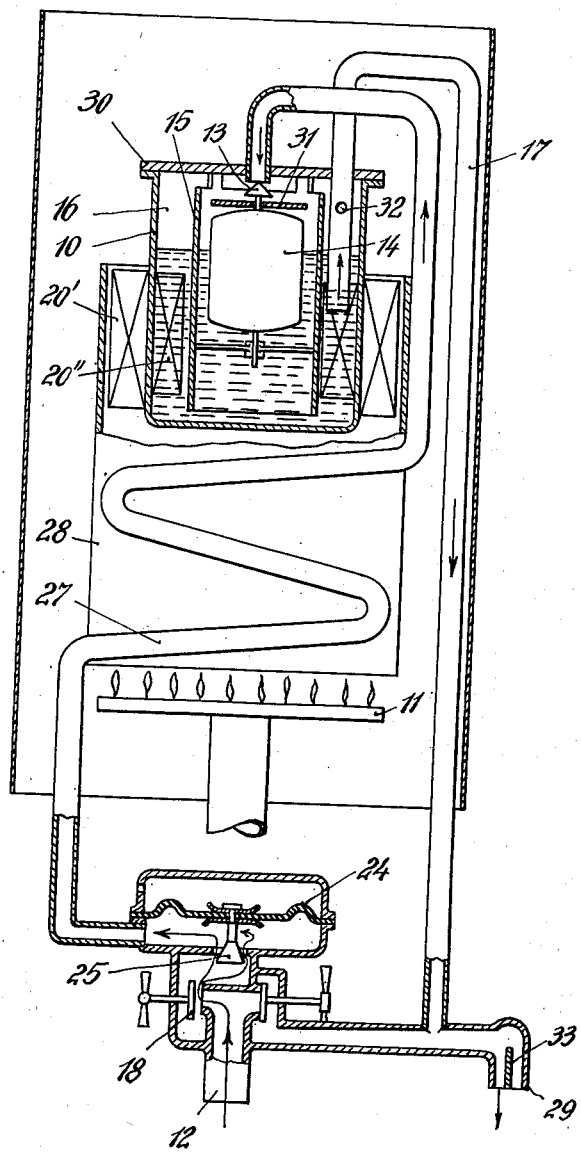

2,162,950

UNITED STATES PATENT OFFICE 2,162,950

HEATER FOR GENERATING BOILING WATER

Georg Hegwein, Dessau, Germany, assignor to Junkers & Co. G. m. b. H., Dessau, Germany Application August 11, 1936, Serial No. 95,335
In Germany August 15, 1935

1 Claim. (Cl. 122—451)

This invention relates to a liquid heater for the production of boiling water of the type wherein the water is raised to boiling point during its passage through the apparatus.

In the case of apparatus of this type, the method employed heretofore has been to restrict the supply of water admitted into the heat exchanger of the apparatus, by means of a manually operated throttle, to such a small amount that the heat supplied is sufficient to raise the temperature of the continuously flowing water to the boiling point. This method, however, has the drawback that pressure fluctuations in the water supply pipe have an injurious effect. If, for example, the pressure in the supply pipe falls, the heat furnished by the burner is too great in relation to the diminished supply of water, and a portion of the water is converted into steam. The amount of heat expanded in generating the steam represents a loss, because the steam escapes, unutilised, into the air; and, moreover, the heater may suffer damage through overheating. On the other hand, an increase in the water pressure, and the consequent increased volume of the flow, would prevent the water from attaining boiling temperature, by reason of insufficient supply of heat, with the result that the user obtains merely warm, but not boiling, water. If the flow of water be maintained at a constant level, by means of a regulating device (volume control), this measure would still fail to preclude the fluctuations in the gas pressure, which might also lead to the heating action being either too high or too low in relation to the amount of water; so that there is either a considerable generation of steam, or the water is not heated to boiling point. In order to avoid this contingency, it would also be necessary to provide a pressure- or volume control device for the fuel supply. This, however, would increase the cost of the appliance and, moreover, would still fail to ensure such an adaptation of the heat supply to the amount of water as would be calculated to just bring the water to a boil, inasmuch as changes in the calorific value of the gas have still to be considered; and, above all, the influence of the temperature of the cold feed water is not excluded. Other appliances for boiling water are known, which are equipped with an automatic regulator influenced by the pressure or temperature of the steam and control the continuously flowing water. For this purpose, however, regulators controlled by temperature are too sluggish in action, especially in view of the small temperatures to which the thermostat has to respond in the case in question. Thus, for example on a sudden decrease in the supply of water, the regulator does not, for some little time, present a wider aperture for the flow of water; and, in the interim, a considerable generation of steam from the water flowing through the heater has occurred. Apparatus in which the supply of water is controlled in subordination to the steam pressure, has the drawback of having to function under a certain positive pressure. In both cases, a certain minimum amount of water flows through the heater irrespective of whether the boiling point has been attained or not; and there is therefore no reliable guarantee as to whether boiling, or merely hot, water will be drawn off.

It is also known to produce boiling water in a pressure boiler to which the cold water is supplied by a float valve controlled by the water level in in the boiler, and from which the boiler water is expelled, through an upcast pipe, by the pressure of the steam generated by the boiling. It is true that these known boiling-water producers do in fact furnish boiling water only; but the delivery of the boiling water is only spasmodic and at irregular intervals, because the amount of water entering the boiler, per unit of time, varies with the temporary pressure in the supply pipe. Moreover, the float controlling the inlet valve for the water must be of very large dimensions, since otherwise the pressure in the water pipe simply opens the inlet valve. These large dimensions, however, make the apparatus very expensive and, in addition, unsuitable for use in domestic kitchens.

According to the present invention the above mentioned drawbacks are obviated by providing a water pressure regulator in front of the float valve controlling the admission of water into the boiler of the apparatus, the regulator ensuring that the pressure in the water supply pipe in front of the float valve never exceeds a certain value. One result of this arrangement is that the boiling water is produced in a perfectly uniform manner, because in all cases, only the same amount of water can reach the boiler, per unit of time; and, by suitably adjusting the control pressure it is even possible for the boiling water to be discharged in a uniform stream. On the other hand, there is also the advantage that the dimensions of the float controlling the water inlet valve can be reduced to such an extent that the necessary float vessel can be accommodated in an ordinary kitchen or domestic hot-water apparatus.

The invention is diagrammatically illustrated in the accompanying drawing.

As shewn the water enters through a house or main supply pipe 12 and, after the hot water tap 18 has been turned on, reaches the heating coil 27 of the apparatus, the flow being controlled by the valve member 25, carried on the diaphragm 24 of a pressure regulator. The coil 27 cools the shell 28 of a combustion chamber through which the heating gases generated in a gas burner 11 ascend and from this coil the water to be heated passes to a boiler consisting of a water tank 10 having a cover 30. On the outside, the tank 10 is provided with gills 20' for the better utilisation of the heating gases, the interior being provided with heating gills 20" to facilitate transmission of the heat absorbed from the heating gases to the water contained in the boiler. The admission of the fresh water into the boiler is controlled by a valve 13 actuated by a float 14. In order to prevent the incoming water from disturbing the regular functioning of the float 14, a baffle plate 31 deflecting the water laterally is arranged above the float. A partition 15 arranged within the boiler divides the contents of the latter into an inner zone communicating with the cold water intake and therefore cooler, and an outer zone in contact with the heating surfaces of the wall 10 of the tank and in which the boiling water is generated. The boiling water is discharged through a pipe 17 which dips below the level of the water in the boiler, this level being kept constant, the pipe ascending until bent downwards to lead to the delivery branch 29, which is fitted with a partition 33 for the separation of steam. A vent 32 provided, in the pipe 17 above the water level in the boiler prevents the boiler being emptied by the suction of the water passing through the pipe 17 after the tap 18 has been turned off.

The operation of the above described apparatus is as follows:

When the hot water tap 18 is turned on, the cold water coming from the supply pipe 12 flows through the coil 27 into the boiler 10 until the float 14 closes the water inlet valve 13. The water-pressure regulator 24, 25 then shuts off the further admission of water and prevents the high water pressure in the supply pipe 12 from pressing on the valve 13. The water present in the boiler is then heated by the heating gases from the burner 11 until it boils. The resulting steam, which collects in the space 16 above the water level now forces such of the water as lies above the mouth of the delivery pipe 17, upwards in said pipe 17 and to the delivery branch 29. At the same time, the water level in the boiler sinks, so that the float 14 opens the inlet valve 13 and allows cold water to flow in. The supply of the cold water is controlled by the pressure regulator 24, 25 in such a manner that, in all cases, only a constant volume of water can reach the boiler per unit of time. After the desired level of the water in the boiler has been restored, the procedure described is repeated. By suitably setting the water-pressure regulator, the boiling water can be caused to discharge continuously in a constant stream.

I claim:

A heater for generating boiling water, comprising a boiler, a cold water feed pipe leading to said boiler, a float-valve controlling the flow of cold water through said feed pipe for maintaining a constant water level in said boiler, a continuously open discharge conduit through which the boiling water is expelled by the pressure of the steam generated within the boiler, and a water pressure-regulator arranged in front of said float-valve for maintaining a constant water-pressure in the feed pipe.

GEORG HEGWEIN.